US012569318B2

(12) United States Patent
Richter et al.

(10) Patent No.: US 12,569,318 B2
(45) Date of Patent: Mar. 10, 2026

(54) DEVICE FOR HEATING A DENTAL MATERIAL

(71) Applicant: Solventum Intellectual Properties Company, Maplewood, MN (US)

(72) Inventors: Christian A. Richter, Feldafing (DE); Korbinian Gerlach, Gauting (DE); Rudolf Schmid, Eichenau (DE); Stefan K. Welker, Geltendorf (DE); Ralf Kelz, Germering (DE)

(73) Assignee: Solventum Intellectual Properties Company, Maplewood, MN (US)

( * ) Notice: Subject to any disclaimer, the term of this patent is extended or adjusted under 35 U.S.C. 154(b) by 802 days.

(21) Appl. No.: 17/753,228

(22) PCT Filed: Apr. 24, 2020

(86) PCT No.: PCT/IB2020/053891
§ 371 (c)(1),
(2) Date: Feb. 24, 2022

(87) PCT Pub. No.: WO2021/053408
PCT Pub. Date: Mar. 25, 2021

(65) Prior Publication Data
US 2022/0287800 A1      Sep. 15, 2022

(30) Foreign Application Priority Data

Sep. 19, 2019      (EP) ...................................... 19198201

(51) Int. Cl.
| *A61C 5/55* | (2017.01) |
| *A61C 5/62* | (2017.01) |
| *A61C 5/66* | (2017.01) |

(52) U.S. Cl.
CPC .................. *A61C 5/55* (2017.02); *A61C 5/62* (2017.02); *A61C 5/66* (2017.02)

(58) Field of Classification Search
CPC .... A61C 5/55; A61C 5/66; A61C 5/62; A61C 5/50; A61C 5/60; A61C 19/003;
(Continued)

(56) References Cited

U.S. PATENT DOCUMENTS

| 8,308,480 B2 | 11/2012 | Bublewitz |
| 2004/0234921 A1 | 11/2004 | Friedman |
(Continued)

FOREIGN PATENT DOCUMENTS

| EP | 1151728 | 11/2001 |
| EP | 1464904 | 10/2004 |
(Continued)

OTHER PUBLICATIONS

Rudolf Barget, A high quality text as facsimile in your desired language may be available amongst the following family members: (manchine translation), EP 1464904 A1. (Year: 2004).*
(Continued)

*Primary Examiner* — Eric J Rosen
*Assistant Examiner* — Mirayda A Aponte

(57) ABSTRACT

A heating device for heating a dental material. The heating device has a body and a socket. The socket is removably received within the body and has a socket wall that forms a receptacle for positioning a container for the dental material therein. The body has a light source for emitting light toward the socket wall in a direction toward the receptacle. The socket wall is at least partially transmissive for infrared light. The heating device allows for heating the dental material within the container.

18 Claims, 8 Drawing Sheets

(58) Field of Classification Search

CPC ..... A61C 19/06; A61C 1/0046; A61C 1/0069; A61C 17/020261; A61C 17/0202; A61C 9/0026; A45D 1/20

USPC .......................................................... 433/89

See application file for complete search history.

(56) References Cited

U.S. PATENT DOCUMENTS

| | | | |
|---|---|---|---|
| 2013/0230821 A1 | 9/2013 | Brown | |
| 2014/0212829 A1* | 7/2014 | Van Den Houdt | ...... A61C 5/50 433/32 |
| 2019/0090980 A1 | 3/2019 | Friedman | |
| 2019/0142700 A1* | 5/2019 | Baeten | ..................... A61C 5/55 433/224 |

FOREIGN PATENT DOCUMENTS

| | | | | |
|---|---|---|---|---|
| EP | 1464904 A1 * | 10/2004 | ............. | A61C 13/20 |
| JP | H0391320 | 9/1991 | | |
| JP | 2005205135 A | 8/2005 | | |
| JP | 2017133812 A | 8/2017 | | |
| WO | WO-2012099965 A2 * | 7/2012 | ............ | B60L 53/122 |
| WO | 2017197191 A1 | 11/2017 | | |
| WO | WO 2020-025485 | 2/2020 | | |
| WO | WO 2021-024093 | 2/2021 | | |

OTHER PUBLICATIONS

Yoon Ae-Suk, Hair curling device using far-infrared ray leds (manchine translation), CN 10263355 (Year: 2016).*

International Commission on Non-ionizing Radiation Protection, Infrared Radiation (Year: 2015).*

1507 Extended EP Search Report for EP19198201.6, PCT/IB2020/053891, Feb. 19, 2020, 3 pages.

International Search report for PCT International Application No. PCT/IB2020/053891 mailed on Jun. 26, 2020, 5 pages.

* cited by examiner

DEVICE FOR HEATING A DENTAL MATERIAL

CROSS REFERENCE TO RELATED APPLICATIONS

This application is a national stage filing under 35 U.S.C. 371 of PCT/IB2020/053891, filed Apr. 24, 2020, which claims the benefit of European Application No. 19198201.6, filed Sep. 19, 2019, the disclosure of which is incorporated by reference in its/their entirety herein.

FIELD OF THE INVENTION

The invention relates to a heating device for heating a dental material, and in particular to a heating device in which a partially infrared transmissive wall is arranged between an infrared light source and a container containing the dental material.

BACKGROUND ART

Dental materials, in particular dental composite materials for filling cavities in a patient's mouth, are often provided in a package that allows for storing an amount of dental material, and also for the dental material from the package directly to a desired location. Although the dental materials are typically composed so that they exhibit properties allowing for appropriate handling in many situations, it is common to warm up dental materials for particular purposes in order to adjust the handling and/or performance accordingly.

There are heating devices that enable the heating of packages by simply warming them up, using a heating element that is based on an electric resistor. Further, there is an approach for heating packages using infrared light while the packages are placed in a dispensing gun.

For example, US 2019/0142700 A1 discloses the application of photon energy to energize dental materials to enhance their physical handling characteristics, efficacy, ability to be delivered, reactivity, polymerization, and/or post-cure mechanical properties, among other attributes.

Although existing approaches provide certain advantages there is still a need for a heating device which can be used conveniently and which is energy efficient.

SUMMARY OF THE INVENTION

The invention relates to a heating device for heating a dental material. The heating device is preferably particularly a tabletop heating device. The tabletop heating device is particularly configured for standing on a table (or other surface) while dental material heated by the heating device is dispensed in a patient's mouth.

The heating device comprises a body and a socket. The socket is removably received within the body, and preferably retained therein. The socket comprises a socket wall (preferably a circumferential socket wall) that forms a receptacle for positioning a container for the dental material therein. In particular, the socket wall preferably forms a receptacle for receiving the container while the container is held in a dispensing gun. The dispensing gun is preferably separate from the heating device and freely movable relative to the heating device while the heating device is standing on a surface. The body comprises a light source for emitting light toward the socket wall in a direction toward the receptacle. The body preferably has a housing and the light source is arranged within the housing. The socket preferably can be arranged such that it protrudes into the housing. Further, the socket wall is at least partially transmissive for infrared light.

Infrared light for the purpose of the present specification is defined by light that exhibits a wavelength within a wavelength range of between 800 nm to 1500 nm. In particular, infrared light for the purpose of the present specification may be light that exhibits a wavelength of about 940 nm or 940 nm.

The invention is advantageous in that it provides a heating device that allows for retaining a dispensing gun having a container containing the dental material therein. Therefore the invention allows the dispensing gun to be placed in the heating device ready for use. A dentist thus can just grasp the dispensing gun at any time when needed. Further, the invention is advantageous in that it provides a heating device that can be operated independent from any dispensation of the material. In particular, any components (for example heating elements or LEDs) that are used for providing heat energy are not part of the dispensing gun. Therefore the dispensing gun does not comprise any components that would be potentially harmful due to a high temperature in use of the dispensing gun in a patient's mouth. The heating device further is energy efficient because it can be activated on demand for any time needed. Further, the LEDs typically exhibit a minimized heat capacity so that the LEDs cool down almost immediately after deactivation.

Generally, the socket wall preferably has a non-uniform transmittance for infrared light. In particular, the socket wall is preferably partially transmissive for infrared light in that the socket wall comprises infrared transmissive portions and further infrared blocking portions.

Preferably the infrared transmissive portions exhibit a transmittance for infrared light of at least 80%. Further, the infrared blocking portions preferably exhibit a transmittance for infrared light of less than 10%.

In an embodiment the receptacle is formed in that the socket wall forms a through-passage extending through the socket along a longitudinal insertion axis. The insertion axis refers to an axis along which the container can be inserted into the receptacle.

In an embodiment the socket wall comprises a reflective layer for reflecting light and preferably for reflecting thermal radiation in a direction toward the receptacle. The reflective layer may be reflective for at least light within a wavelength range of infrared light (or at a wavelength of about 940 nm or 940 nm), but typically may be reflective for light within a broader wavelength range, for example including the whole visible light spectrum and more. Accordingly the reflective layer may be or comprise a mirror. The reflective layer preferably delimits the receptacle. For example, the reflective layer may be arranged directly adjacent the through-passage. The reflective layer may be formed of several sublayers that in combination exhibit a light reflective property. For example a plurality of transparent plastic films having different refractive indices and laminated together may provide a metal free reflective layer. The reflective layer may further be formed of a metal layer, for example an aluminum or silver coating.

In an embodiment the reflective layer comprises infrared transmissive portions and infrared blocking portions. Accordingly the reflective layer may provide the socket wall with infrared blocking portions and may have openings to provide infrared transmissive portions.

In an embodiment the socket wall comprises an infrared transmissive layer covering the infrared transmissive portions and the infrared blocking portions of the reflective layer. For example the socket wall may be formed by a contiguous sleeve made of an infrared transmissive material, and that sleeve may be inwardly provided (for example coated) with the reflective layer. The reflective layer may have openings leaving portions of the socket wall uncovered. Those portions that are covered by the reflective layer correspond to infrared blocking portions, whereas those portions that are uncovered from the reflective layer correspond to infrared transmissive portions.

In a further embodiment the socket wall is formed by a sleeve made of an infrared transmissive material, and that sleeve is provided with through-holes. Again that sleeve may be inwardly provided (for example coated) with the reflective layer as described above. In a process of coating (for example sputtering) the sleeve with the reflective layer, the through-holes result in the reflective layer to form openings so that the through-holes are uncovered from the reflective layer. Those portions that are covered by the reflective layer correspond to infrared blocking portions, whereas the openings correspond to infrared transmissive portions.

Accordingly the socket wall may be formed of infrared transmissive portions and with infrared blocking portions.

In an embodiment the infrared transmissive portions exhibit a transmittance for infrared light of at least 80%. This can be achieved, for example, by a socket wall made of PMMA or PC (Makrolon 2405 450 601 available from the company BASF, Germany) and having a thickness of between about 1 mm and about 2.5 mm. The thickness in that regard is understood as the dimension of the socket wall along which the infrared light travels through the socket wall. Further, the infrared blocking portions preferably exhibit a transmittance for infrared light of less than 10%: This can be achieved, for example, by a silver coating or an aluminum coating. The silver coating as well as the aluminum coating may have a thickness within a range of 10 to 20 nm. Infrared blocking portions and infrared transmissive portions in combination in one socket wall or sleeve can further be obtained by two-shot injection molding of an infrared blocking plastic material and an infrared transmissive plastic material. For example in a first shot the sleeve may be molded from the infrared blocking plastic material. The sleeve may form through-holes that are filled with the infrared transmissive plastic material in a second shot. In such an embodiment the reflective layer is optional.

In an embodiment the light source comprises a plurality of light emitting diodes (LEDs). Preferably each of the LEDs is configured for emitting infrared light, in particular light at a peek wavelength of about 940 nm or 940 nm. The light power of the infrared light is preferably about 14 W.

In an embodiment the LEDs are arranged on a circumference around the insertion axis. The LEDs are preferably oriented for emitting light toward the insertion axis. The insertion axis may be the axis of symmetry of at least part of the receptacle. Thus, a container placed on the insertion axis can be exposed to infrared light from the light source.

In a preferred embodiment the LEDs are arranged outside the socket (and thus also outside the through-passage). Therefore the light source is protected from getting in touch with the container. Thus, the light source is prevented from getting contaminated from any undesired substance (for example residual dental material, bacteria and/or dirt) that may adhere on the container. Preferably, the light source is fixed within the body, and the socket is removably placeable in the body and therefore removably placeable relative to the light source.

In one embodiment each of the LEDs is arranged for emitting light through one of the infrared transmissive portions. Accordingly, each of the LEDs is preferably arranged next to an infrared transmissive portion.

The infrared transmissive portions and the LEDs are preferably particularly arranged on different levels or positions along the insertion axis. Some of the LEDs may be arranged radially around the insertion axis and on a common plane at a first level arranged at a first axial position. Some of the LEDs may be arranged radially around the insertion axis and on a common plane at a second level arranged at a second axial position. And some of the LEDs may be arranged radially around the insertion axis and on a common plane at a third level arranged at a third axial position. The first, second and third axial position (and the corresponding three planes) are axially offset from each other along the insertion axis. In a particular embodiment the LEDs are arranged as follows:

1 LED on the first level;
4 LEDs on the second level; and
2 LEDS on the third level.

In an embodiment the heating device comprises a heat sink. The heat sink is preferably thermally coupled to each of the LEDs. Preferably, the LEDs are each mounted on an electric circuit board. According to the invention the heating device comprises 4 circuit boards that are each fixed (in particular screwed) onto the heat sink. The heat sink may be provided with a temperature sensor. The heating device may further comprise a control circuitry that is adapted to receive a signal from the temperature sensor.

In an embodiment the heating device has a button for activating a heating operation of the heating device. The heating device may have a timer function which automatically deactivates the heating operation after a predetermined time. A preferred predetermined time may be within a range of 8 seconds to 20 seconds. Further, the heating operation may be interrupted by pressing the button while the heating operation is activated. The button may comprise an indicator light. The indicator light may be activated for the time the heating operation is activated and the indicator light may be deactivated otherwise. Thus, a user of the heating device can recognize whether or not the heating operation of the heating device is activated or deactivated.

The control circuity is preferably further adapted to interrupt the heating operation upon receiving a signal from the temperature sensor which is indicative of a temperature that exceeds a predetermined value. For example, the control circuity may be adapted to interrupt the heating operation upon the temperature sensor sensing a temperature of the heatsink exceeding 65° C.

In one embodiment the heating device comprises a rechargeable battery (preferably a Lithium Ion battery) for powering the light source. Therefore the heating device can be operated in a wireless manner. The heating device may further comprise a metallic wire charging coil or helix for wireless charging of the battery. Further, the device may be connectable to an external power source for recharging the battery.

In one embodiment the metallic wire charging coil is flat and the heating device further comprises a charging pad having a second charging coil on which the body of the heating device can be placed for inductive charging of the battery. The charging pad can be connected to an external power source. Preferably, the thickness (or height) of the first and/or second charging coil is smaller than 5 mm, more preferably smaller than 4 mm and even more preferably smaller than 3 mm. A thickness of 2 mm has been found to be particularly advantageous.

Preferably, the thickness (or height) of the charging pad is smaller than 20 mm, more preferably smaller than 15 mm and even more preferably smaller than 10 mm. Preferably, the diameter of the first and/or second coil is at least 20 mm, more preferably at least 60 mm and even more preferably at least 80 mm. Preferably, the second charging coil is larger in diameter and/or thickness than the first charging coil.

The first and/or second charging coils are preferably made of high frequency litz wires, for example RUPALIT® high frequency litz wires constructed from RUPOL®, RUPEX® or RUTHERM® enameled copper wires.

The first and/or second charging coils are preferably embedded on a ferrite core preferably having a minimum thickness of 0.8 mm and preferably having a maximum thickness of 5 mm. A thickness of 2 mm has been found to be particularly advantageous.

In one embodiment the heating device comprises a docking station to which the body of the heating device can be docked. The docking station can provide an electrical connection between the docking station and the battery for charging of the battery. In some embodiments the docking station can have a charging coil providing an electrical connection between the docking station and the battery for wireless charging of the battery. The docking station can be connected to an external power source. In some embodiments the body can comprise an electrical contact, which is complementary to an electrical contact of the docking station and which is preferably arranged toward the bottom of the body and provides a contact for the electrical contact of the docking station. The body can be docked to the docking station such that the electrical contact of the docking station contacts the electrical contact of the body to charge the battery. The body can be removed from the docking station and moved to a different location while the docking station remains stationary.

The invention further relates to a system that comprises the heating device of the invention and a capsule containing the dental material. The capsule preferably comprises a body forming a chamber for the dental material, a dispensing nozzle connected to the chamber for dispensing the dental material. Further the capsule may comprise a piston arranged in the chamber for urging the dental material toward the dispensing nozzle.

The system may further comprise a dispensing gun for retaining the capsule therein and for advancing the piston of the capsule.

DETAILED DESCRIPTION OF THE INVENTION

Figure 1:
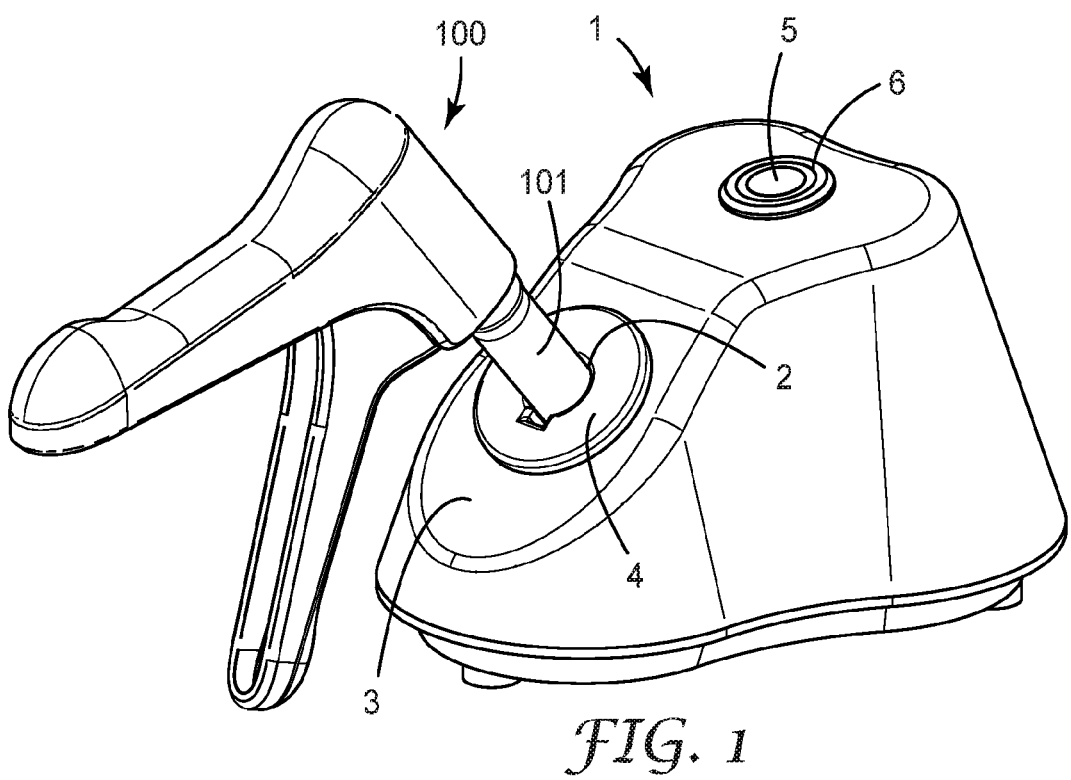
FIG. 1 is a perspective view of a system according to an embodiment of the invention.
Figure 1A:
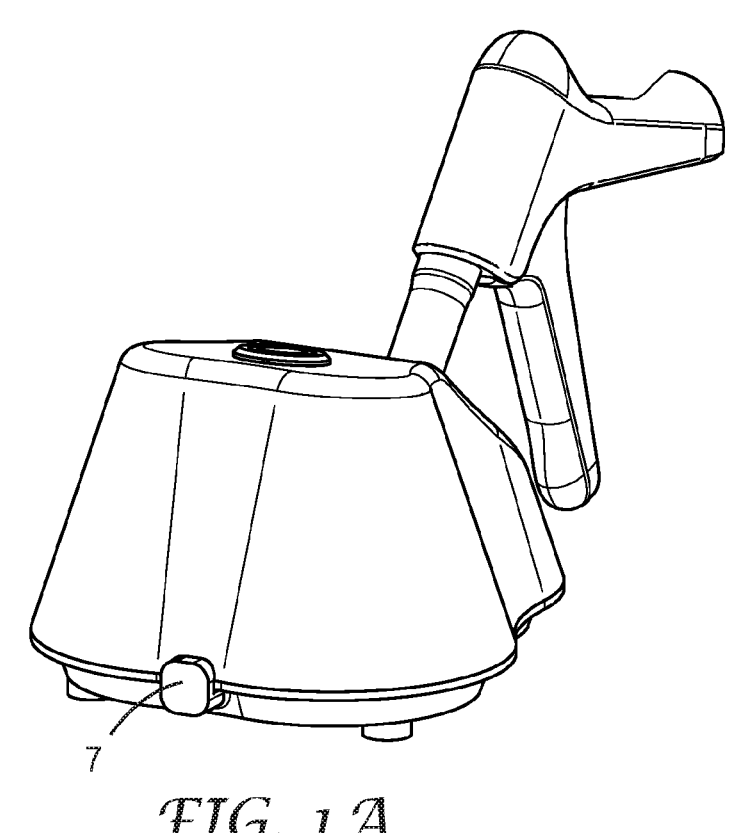
FIG. 1A is a rear view of the device shown in FIG. 1.

FIG. 1 shows a heating device 1 according to the invention. The heating device 1 particularly is a tabletop heating device, i.e. a device configured for standing on a table while the device is used. The heating device 1 is further configured for heating a dental material, such as a dental composite filling material. Such a dental composite filling material typically contains a flowable matrix material that is provided with fillers and additives. The matrix material is typically flowable so that it can be used for filling a cavity in a tooth to be restored, for example. The matrix material further is typically hardenable, in particular light hardenable by exposing it to visible blue light. Thus, the dental composite material can be shaped into the tooth cavity and can be hardened once it is in place. A typical dental composite material is based on methacrylate.

By heating, the viscosity of the dental material can be reduced so that it can be shaped more easily. Further, the dental material is typically provided in a container from which the dental material is to be extruded. The heated dental material, due to the reduction of its viscosity, can typically also be extruded more easily (i.e. at a lower extrusion force) than the same material at room temperature. The heating device 1 is particularly configured for heating the container so that the so heated container heats the dental material contained therein.

The heating device 1 generally comprises a body 3 and a receptacle 2. The receptacle 2 is shaped and sized so that a mouthpiece 101 of a dental applicator 100 can be at least partially received therein. A container (not visible in this view) retained in the dental applicator 100 (in particular within the mouthpiece 101) thus can be positioned within the receptacle 2.

The receptacle 2 is formed by a socket 4 of the heating device 1. The socket 4 is removably received within the body 3 of the heating device 1. Therefore the socket 4 can be removed from the body 3 for cleaning and/or for exchanging.

The heating device 1 further has a button 5 for activating a heating operation of the heating device 1. The heating operation causes the heating device 1 to provide heat energy into the receptacle 2 (so that dental material, when positioned within the receptacle 2, gets heated). The heating operation causes the heating device 1 to provide heat energy into the receptacle 2 for a predetermined time period only and causes the heating device 1 to automatically deactivate the heating operation after. In case the heating operation is not activated the heating device 1 does not provide any heat energy into the receptacle 2. The heating device 1 of the invention therefore only heats on demand for a predetermined time period, and thus helps minimizing energy consumption. In the example, the heating device 1 has an indicator light 6, which indicates when the heating operation is active. Further, in the example the heating device 1 is battery powered and has means for charging the battery. In the example, the heating device 1 is furnished with a power connector 7 for connecting a power source for powering a charging electronic.

Figure 2:
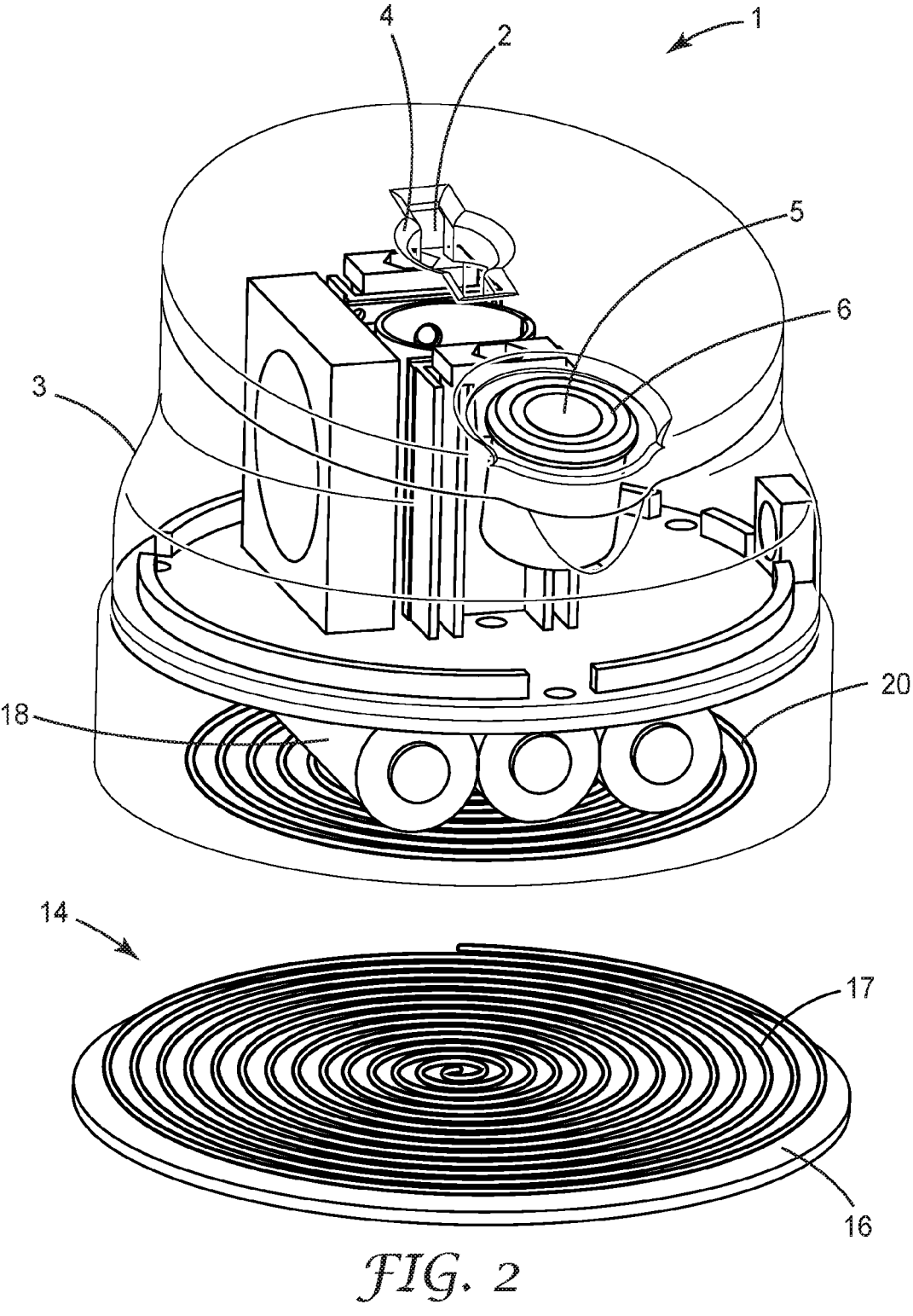
FIG. 2 is a perspective view of the system according to an embodiment of the invention.

The heating device 1 may further have a wireless charging interface 14 for coupling with a wireless charger. As shown in FIG. 2, the charging interface 14 can comprise a charging pad 16 on which the body 3 housing rechargeable batteries 18 is placed for charging the rechargeable batteries 18. The body 3 houses a flat charging coil 20 arranged toward the end of the body 3 and electrically connected with the rechargeable batteries 18. The charging pad 16 comprises a second charging coil 17 which can inductively communicate with the flat charging coil 20 housed in the body 3. The charging pad 16 is connected to an external power source via a charging plug, such as a USB C plug (not shown in FIG. 2).

While the flat charging coils 17 and 20 are shown to have a spiral shape in FIG. 2, they may alternatively have a helical shape with several windings of constant radius as is common for charging coils.

To charge the batteries 18, the body 3 of the heating device 1 is placed on the charging pad 16. The batteries 18 are thereby charged via induction between the flat charging coil 20 housed in the body 3 and the second charging coil 17 of the charging pad 16.

The body 3 can then be removed from the charging pad 16 by the user and moved to a different location while the charging pad 16 remains stationary. This allows for a flexible relocation of the body 3 without the hassle of a trailing power cord. Due to the increased mobility, the heating device 1 can conveniently be moved to different locations, in particular close to the patient, within a health treatment environment.

Furthermore, since the user of the device 1 does not have to connect the dental applicator 100 or the body 3 to a charger, in this case the charging pad 16 with a plug, the risk of failure of the heating device 1 due to plug breakage or plug damage is reduced. This also makes it easier to clean and/or disinfect the device 1.

Figure 3:
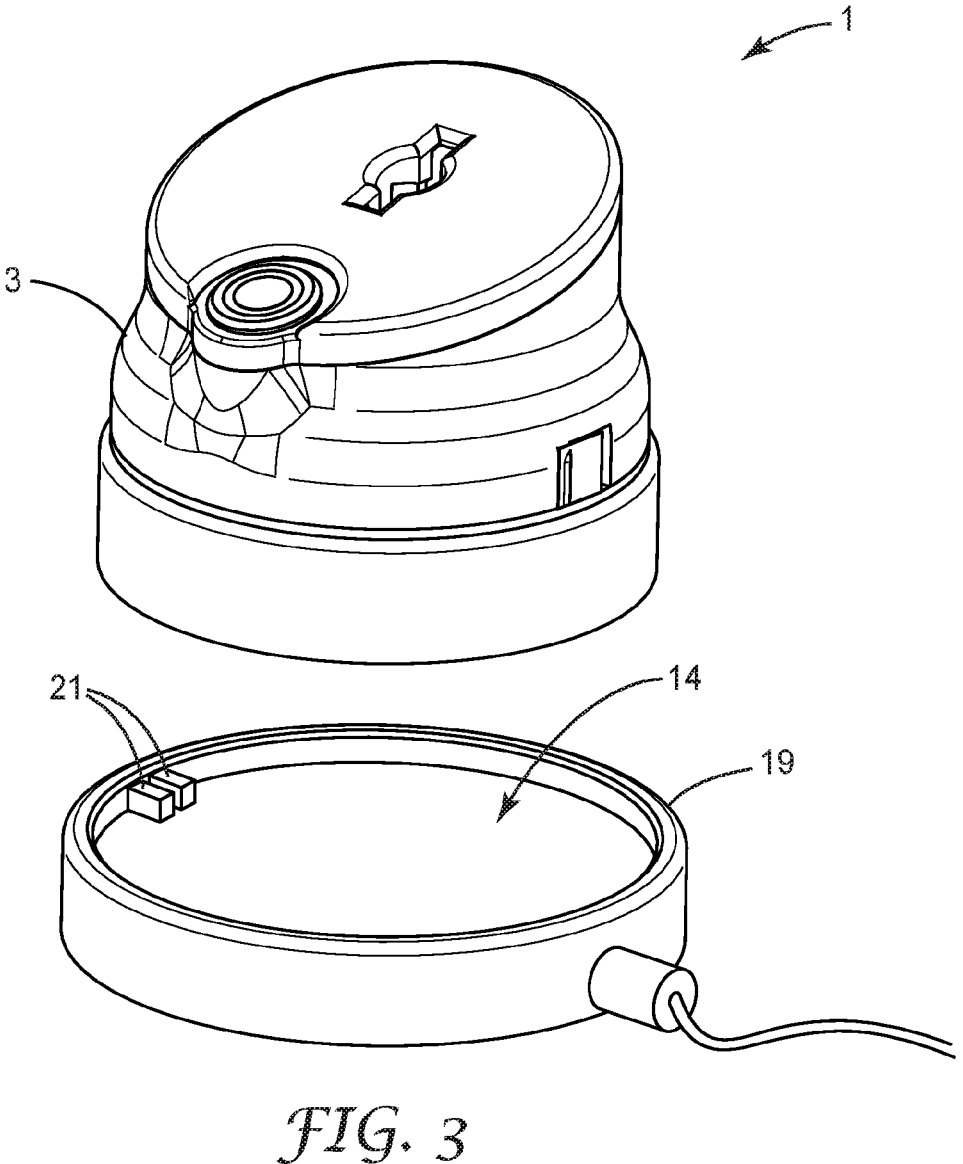
FIG. 3 is a perspective view of the system according to an embodiment of the invention.

The charging interface 14 can alternatively comprise a docking station 19, as shown in FIG. 3. The docking station 19 can include electrical contacts 21 which can contact corresponding electrical contacts (not shown in FIG. 3) on the body 3, to provide charging from the docking station to the rechargeable batteries 18 in body 3. Thus, no wireless charging is necessary in case of the embodiment shown in FIG. 3 even though an optional charging coil (not shown) might also be provided to make the docking station more versatile.

The body 3 can be docked to the docking station 19 such that the electrical contacts 21 of the docking station 19 contact the corresponding electrical contacts on the body 3 to charge the batteries 18.

Alternatively, in another embodiment, the docking station 19 need not have physical electrical contacts, but rather simply provides the physical structure to facilitate the proper placement of the body 3 onto the charging pad 16 for inductive charging, such as a structure extending vertically upwards from the perimeter of the placement surface of the docking station 19, configured for example as a collar extending around the circumference of the docking station 19.

The body 3 can thus be removed from the docking station 19 and moved to a different location while the docking station 19 remains stationary.

The elements housed within the body 3 are not visible in FIG. 3. However, the configuration of the elements housed within the body 3 can be similar or identical to those shown in FIG. 2. However, in the case of the embodiment shown in FIG. 3, the flat charging coil 20 can be omitted in comparison with the embodiment shown in FIG. 2.

The charging interface 14 comprising the docking station 19 can also provide a robust and reliable charging means and also prevents failure of the heating device 1 due to plug breakage or plug damage.

The batteries 18 can also be charged directly via a plug, such as a USB C plug, connected to the device 1 without the use of a (wireless) charging interface 14.

Figure 4:
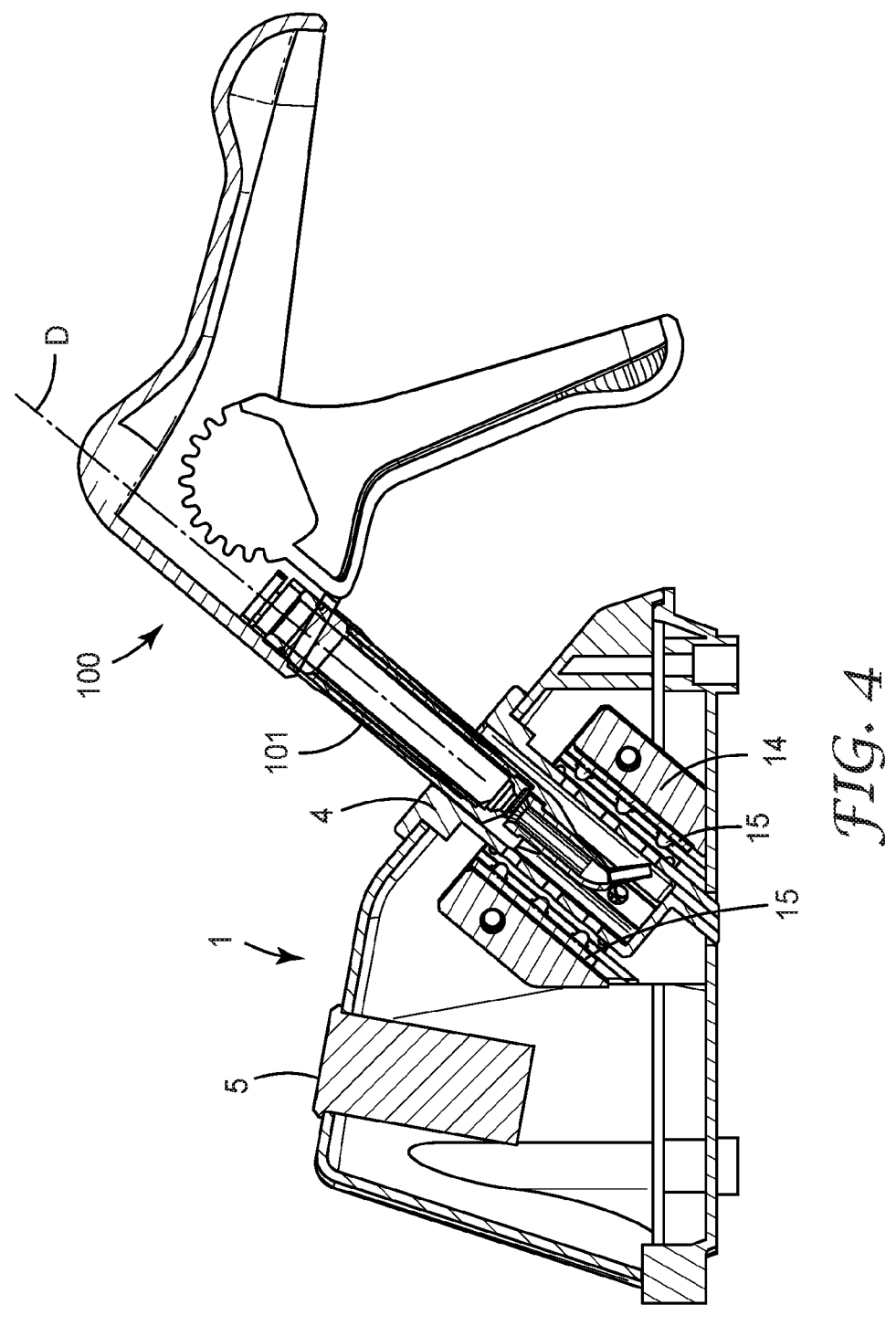
FIG. 4 is a cross-sectional side view of the system according to an embodiment of the invention.

FIG. 4 shows the heating device 1 in a cross-sectional view. The heating device 1 is shown in a situation in which the dental applicator 100 is placed with its mouthpiece 101 within the socket 4.

Figure 5:
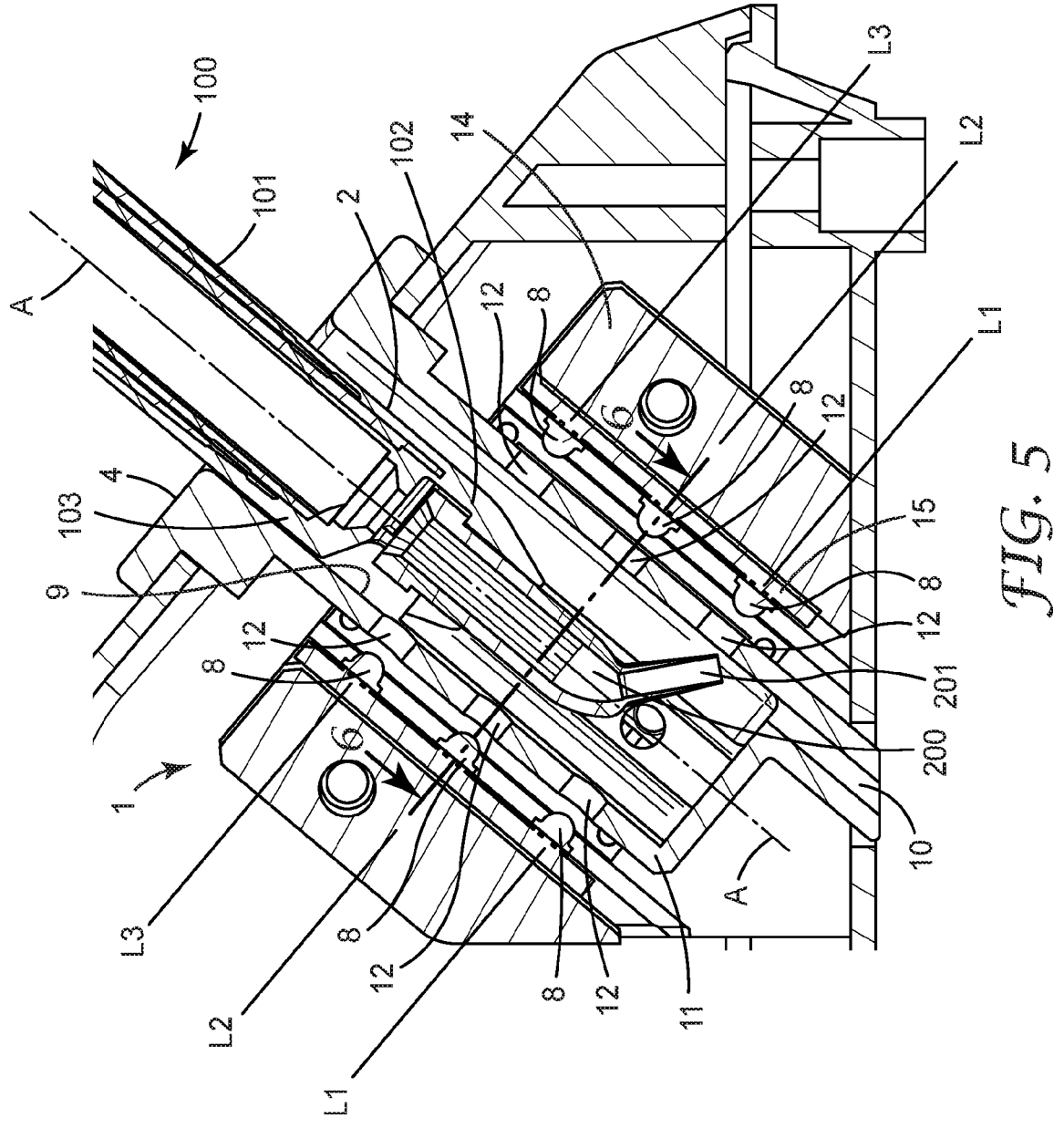
FIG. 5 is a detail view of FIG. 4.

As shown in more detail in FIG. 5, a container (in the example a dental capsule 200 with a dispensing nozzle 201) is retained in the mouth piece 101 of the dental applier 100 and positioned within the socket 4. The socket 4 forms the receptacle 2. In the example the receptacle 2 is formed by a through-passage 9 extending entirely through the socket 4. Accordingly any cleansing agent and/or disinfectant used for cleaning the heating device 1 and reaching the receptacle 2 can flow through the socket 4 and escape through the outlet 10 of the through passage 9. The receptacle 2 in particular extends along a longitudinal insertion axis A. The insertion axis A further defines a dimension along which the dispensing gun 100 can be inserted in the heating device 1.

The socket 4 further is shaped and sized such that the shape and size of the receptacle 2 generally corresponds to a negative shape of at least part of the mouthpiece 101 having the capsule 200 retained therein. Thus the dispensing gun 100 is guided by the receptacle 2 during insertion in the receptacle and held in place firmly when inserted. Further, the mouthpiece 101 of the dispenser 100 typically has a trough-shaped front portion 102 that projects from a hollow-cylindrical shaft 103. The trough-shaped front portion 102 allows the capsule 200 to be inserted in or removed from the dispensing gun 100 in a direction radially of a dispensing direction D (see FIG. 4) which in the example is located congruent with the insertion axis A (FIG. 5).

Figure 8:
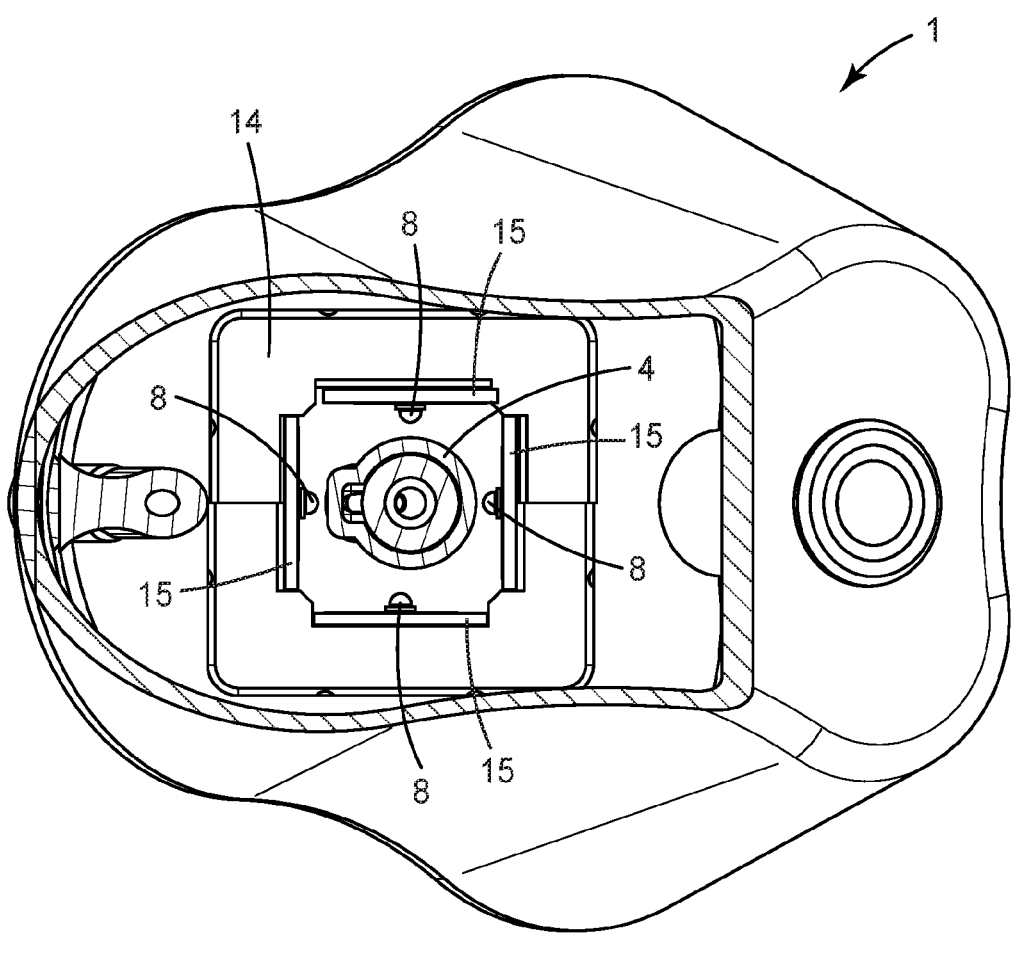
FIG. 8 is a cross-sectional top view of the system according to an embodiment of the invention.

The body 3 of the heating device 1 contains a light source for emitting infrared light from outside the socket 4 in a direction toward the receptacle 2. In particular the light source is formed by a plurality of infrared light emitting diodes (LEDs) 8 that are arranged on several levels L1, L2, L3 around the insertion axis A. Each level L1, L2 and L3 may have up to four LEDs that are arranged uniformly distributed on a plane perpendicular to the insertion axis A, in particular angularly offset by 90 degrees relative to each other (see FIG. 8) and oriented to emit infrared light radially toward the insertion axis. In the example, only seven LEDs are used, one LED 8 on level L1, four LEDs 8 on level L2 and two LEDs 8 on level L3. This arrangement of the LEDs 8 provides more heat to a central portion of the capsule 200 than to the ends.

Each of the LEDs 8 are mounted on a circuit board 15. The LEDs 8 in the example are electrically connected to one of the circuit boards 15. Further, each circuit board 15 is mounted on a heat sink 14. Thus, the LEDs 8 are thermally coupled to the heat sink 14 (via the circuit board(s) or directly). Therefore heat that is generated by the LEDs is dissipated via the heat sink 14.

The socket 4 has a socket wall 11 having a through-hole 12 in front of each LED 8. The through-holes 12 are positioned such that light emitted from each of the LEDs 8 can pass the socket wall 11 through the through-holes 12. In particular, the through-holes preferably extend perpendicular or transverse to the longitudinal axis A. Therefore the socket wall 11 may be formed of an infrared blocking material and may be partially infrared transmissive due to the through-holes 12.

Figure 6:
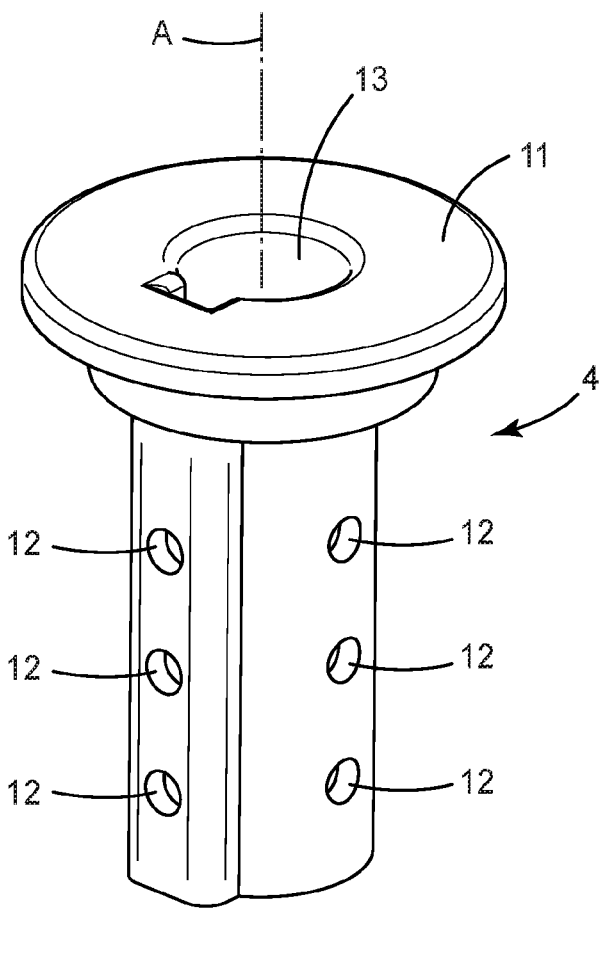
FIG. 6 is a perspective view of a socket of a heating device according to an embodiment of the invention.

As shown in more detail in FIG. 6 the socket wall 11 has a reflective layer 13. The reflective layer 13 in the example is arranged on the socket wall 11 adjacent the through-passage 9. The reflective layer 13 in the example is provided by a metal (in particular aluminum) coating, but may be provided by other means too. The reflective layer 13 provides for light (in particular infrared light) coming from the through-passage 9 and impinging on the reflective layer 13 to be reflected back into the through-passage 9. Thus, infrared light, once reaching the through-passage is substantially captured within the through-passage 9. This helps maximizing the heating efficiency of the heating device 1.

Figure 7:
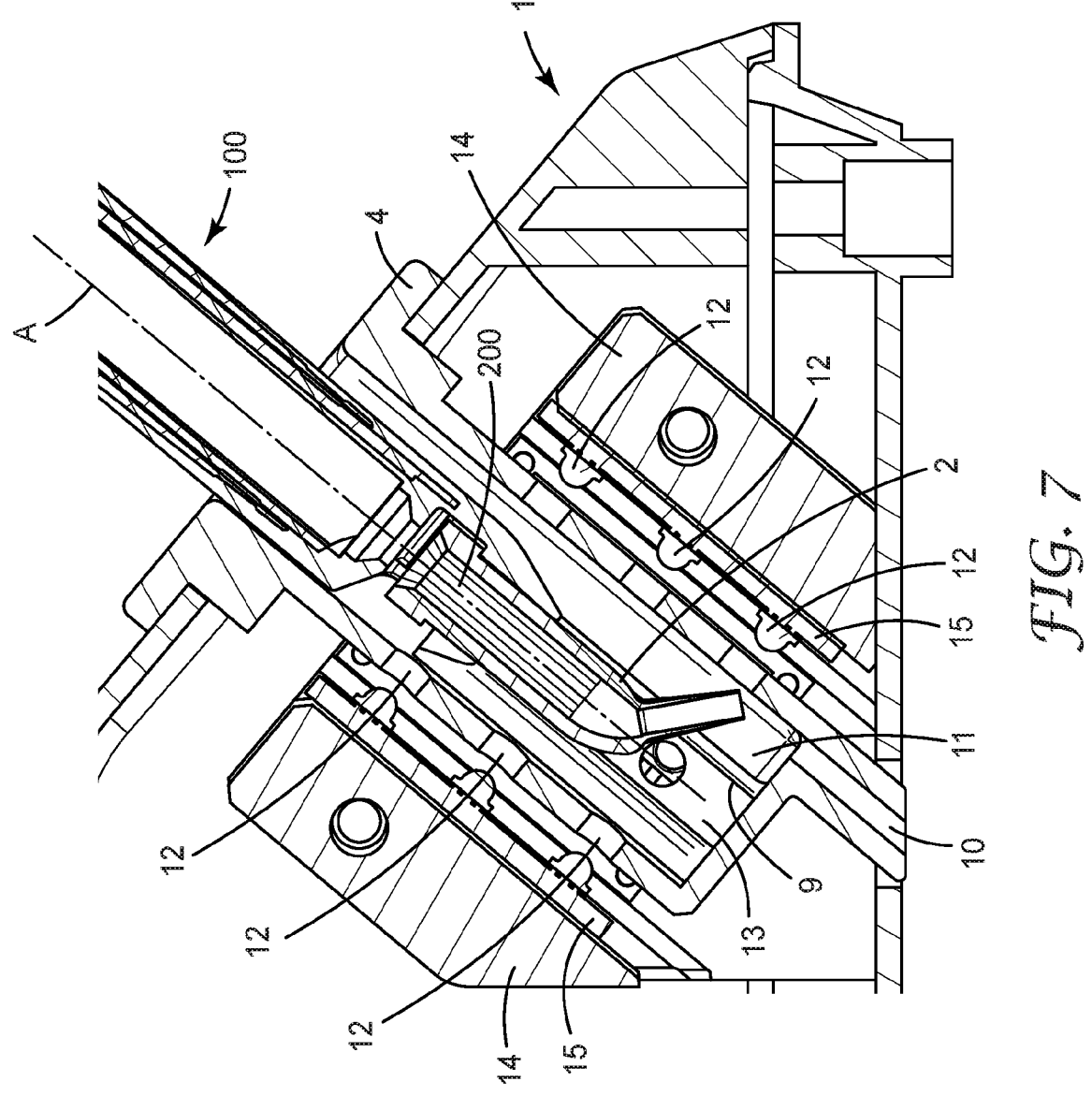
FIG. 7 is a cross-sectional side view of the system according to another embodiment of the invention.

FIG. 7 shows a system in which a container (in the example a dental capsule 200) is retained in the mouthpiece 101 of the dental applier 100 and positioned within the socket 4. The heating device 1 is identical with the example shown in FIG. 5 except that the socket 4 has a slightly different configuration.

The socket 4 again forms the receptacle 2 in the form of a through-passage 9 extending entirely through the socket 4. The through-passage 9 forms the outlet 10. The receptacle 2 extends along a longitudinal insertion axis A.

The socket 4 further is shaped and sized such that the shape and size of the receptacle 2 generally corresponds to a negative shape of at least part of the mouthpiece 101 having the capsule 200 retained therein. In the example the socket 4 has a contiguous socket wall 11. Instead of through-holes the socket wall 11 has an infrared transmissive area 12 in front of each LED 8. The infrared transmissive areas 12 each are provided by a window (not visible) in the reflective layer 13. The infrared transmissive areas 12 are positioned such that light emitted from each of the LEDs 8 can pass the socket wall 11 through the infrared transmissive areas 12. The socket wall 11 is formed of an infrared transmissive material and is partially infrared blocking in areas outside the windows.

It is noted that although the system of the invention is shown in combination with a capsule as the container, in another example the container may be a screw tube.

The invention claimed is:

1. A heating device for heating a dental material, the heating device comprising a body and a socket, wherein the socket is removably received within the body and comprising a socket wall that forms a receptacle for positioning a container for the dental material therein, wherein the body comprises a light source for emitting light toward the socket wall in a direction toward the receptacle, wherein the light source comprises a plurality of light emitting diodes (LEDs) configured for emitting infrared light, and wherein the socket wall is at least partially transmissive for infrared light, wherein infrared light being defined by light that exhibits a wavelength within a wavelength range of between 800 nm to 1500 nm; and wherein the socket wall comprises a reflective layer for reflecting light and thermal radiation in a direction toward the receptacle.

2. The heating device of claim 1, wherein the receptacle is formed in that the socket wall forms a through-passage extending through the socket along a longitudinal insertion axis.

3. The heating device of claim 1, wherein the reflective layer delimits the receptacle.

4. The heating device of claim 1, wherein the reflective layer comprises infrared transmissive portions and infrared blocking portions.

5. The heating device of claim 4, wherein the infrared transmissive portions exhibit a transmittance for infrared light of at least 80%, and wherein the infrared blocking portions exhibit a transmittance for infrared light of less than 10%.

6. The heating device of claim 4, wherein the socket wall further comprising an infrared transmissive layer covering the infrared transmissive portions and the infrared blocking portions.

7. The heating device of claim 4, wherein the (LEDs) are configured for emitting light within a wavelength range of 800 nm to 1400 nm.

8. The heating device of claim 7, wherein the LEDs are arranged on a circumference around the insertion axis, and being oriented for emitting light toward the insertion axis.

9. The heating device of claim 7, wherein the LEDs are arranged outside the socket.

10. The heating device of claim 7, wherein each of the LEDs is arranged for emitting light through one of the infrared transmissive portions.

11. The heating device of claim 1, comprising a rechargeable battery for powering the light source.

12. The heating device of claim 11, further comprising a charging coil for wireless charging of the battery.

13. The heating device of claim 12, wherein the heating device further comprises a charging pad having a second charging coil on which the body of the heating device can be placed for inductive charging of the battery.

14. The heating device of claim 11, further comprising a docking station to which the body of the heating device can be docked, wherein the docking station provides an electrical connection between the docking station and the battery for charging of the battery.

15. A system, comprising the heating device of claim 1 and a capsule containing the dental material, wherein the capsule comprises a body forming a chamber for the dental material, a dispensing nozzle connected to the chamber for dispensing the dental material and a piston arranged in the chamber for urging the dental material toward the dispensing nozzle.

16. The system of claim 15, further comprising a dispensing gun for retaining the capsule therein and for advancing the piston of the capsule.

17. The system of claim 15, wherein the dental material is contained in a capsule.

18. The system of claim 15, wherein the dental material is a dental composite filling material.

* * * * *